United States Patent [19]

Upton et al.

[11] Patent Number: 4,591,175
[45] Date of Patent: May 27, 1986

[54] SHOPPING CART ANTI-THEFT APPARATUS

[75] Inventors: Gene Upton, Mission Viejo; Dennis Brown, Lemon Grove, both of Calif.

[73] Assignee: Kart Guard Internationale, Inc., San Diego, Calif.

[21] Appl. No.: 582,532

[22] Filed: Feb. 22, 1984

Related U.S. Application Data

[63] Continuation-in-part of Ser. No. 434,941, Oct. 18, 1982, abandoned.

[51] Int. Cl.⁴ .............................................. B62B 5/04
[52] U.S. Cl. ................... 280/33.99 C; 16/35 R
[58] Field of Search ............... 280/33.99 C, 33.99 R, 280/33.99 A; 16/35 R, 35 D; 188/111, 1.12

[56] References Cited

U.S. PATENT DOCUMENTS

| | | | |
|---|---|---|---|
| 2,081,594 | 5/1937 | McIntosh | 16/35 R |
| 2,544,924 | 3/1951 | Herold | 16/35 R |
| 2,964,140 | 12/1968 | Berenzy | 280/33.99 C |
| 3,031,037 | 4/1962 | Stollman | 280/33.99 C |
| 3,495,688 | 2/1970 | Isaacks | 280/33.99 C |
| 3,652,103 | 3/1972 | Higgs | 280/33.99 C |
| 3,751,757 | 8/1973 | Stosberg et al. | 16/35 R |

*Primary Examiner*—David M. Mitchell
*Attorney, Agent, or Firm*—Brown, Martin & Haller

[57] ABSTRACT

A shopping cart anti-theft apparatus is described. The apparatus is designed to be mounted on the swivel caster of a wheel of a shopping or other cart, and comprises a locking assembly and an actuating assembly for operating the locking assembly. The actuating assembly includes a magnet responsive to the cart passing over a magnetic barrier to actuate the locking assembly. Thus, if a user attempts to remove a cart from a store parking lot by pushing it over a magnetic barrier arranged around the periphery of the parking lot, the swivel caster will be maintained in an off-center, turn-inducing position such that the cart can only travel in a circle if pushed.

25 Claims, 9 Drawing Figures

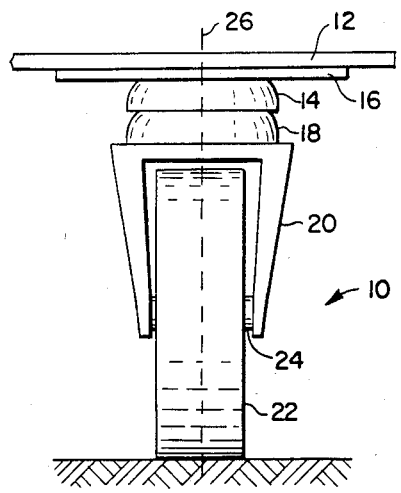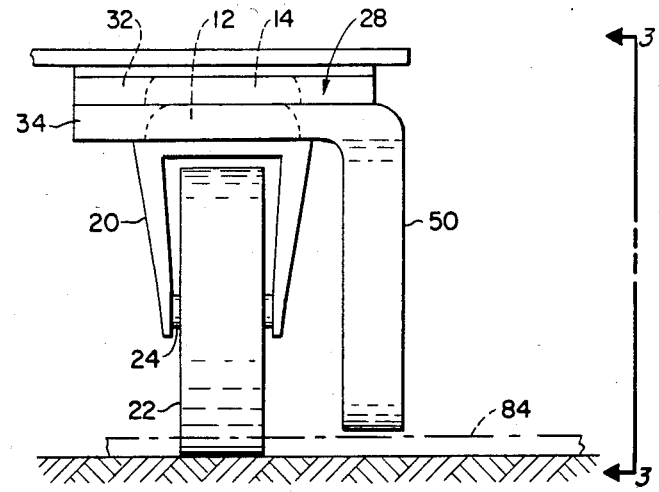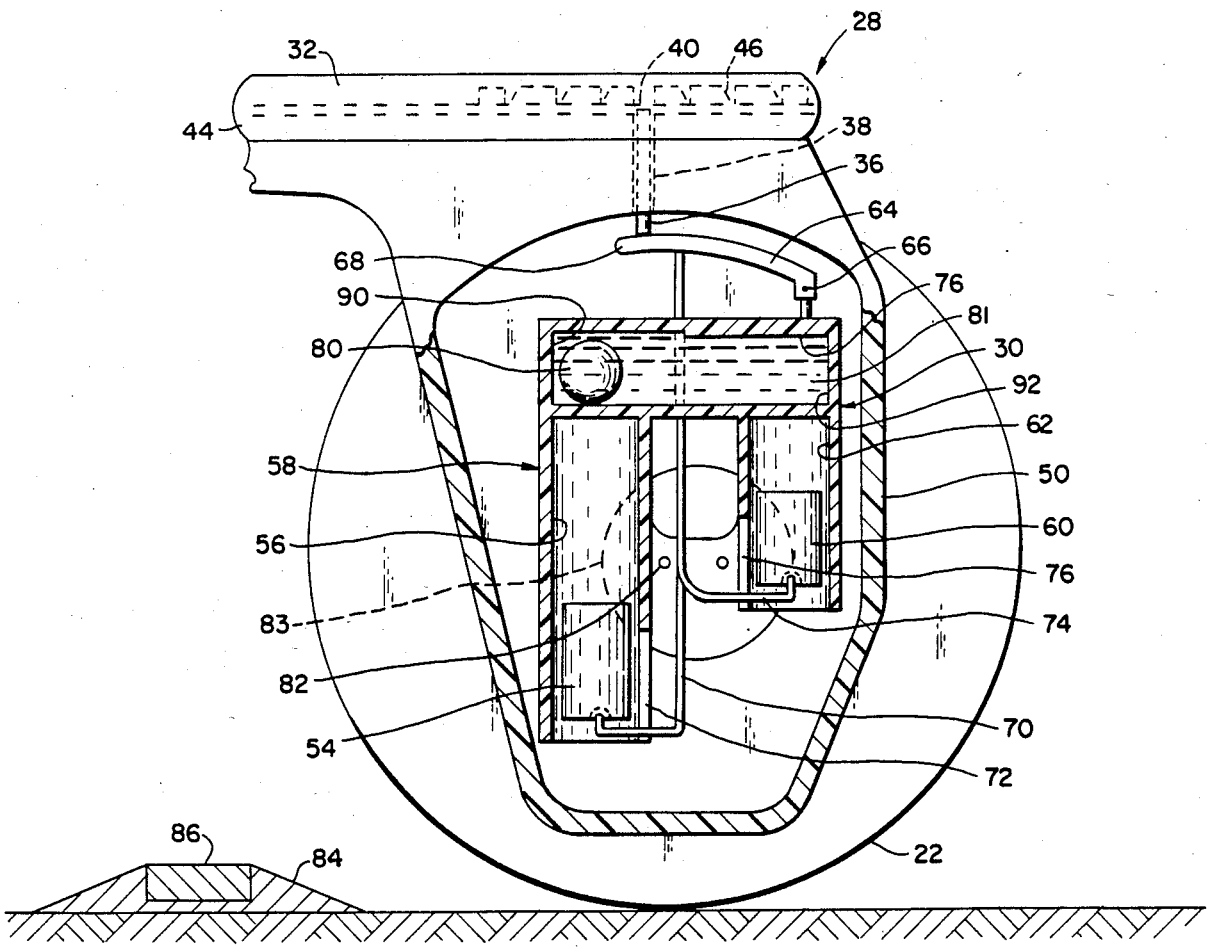

SHOPPING CART ANTI-THEFT APPARATUS

This is a continuation-in-part of application Ser. No. 434,941, filed Oct. 18, 1982 and now abandoned.

BACKGROUND OF THE INVENTION

1. Field of the Invention

This invention relates generally to anti-theft devices, and more particularly to an anti-theft apparatus for use with market-type shopping carts and other similar swivel-wheeled carts.

2. Prior Art

At the present time, there are many thousands of markets and stores which utilize a significant number of shopping carts in or on their premises. Customers are generally allowed to take shopping carts from the store to their car in the parking lot. Unfortunately, a significant number of shopping carts are removed or stolen from store parking lots. The loss rate from thefts is alarmingly high, on the increase, and is extremely expensive for the owners. It is estimated that more than a million shopping carts are stolen annually from markets and stores in the United States alone. These thefts result in annual monetary losses of many millions of dollars for store owners.

Shopping cart anti-theft devices proposed in the past have mainly comprised some form of wheel locking or braking system. See, for example, U.S. Pat. No. 3,031,037 to Stollman. In this device a wheel of a shopping cart is locked against rotation when the cart passes over a magnetic barrier 40. All of the known devices of this type require some modification of the wheel itself so that it can engage with a locking member to lock the wheel in place. Although this is a deterrent to theft, the cart can still be pushed against the action of the locked wheel, which will then slide along the ground. The locking system is often open to easy manual tampering or release, and the cart can be tipped to avoid actuation of the system by the magnetic barrier.

SUMMARY OF THE INVENTION

It is an object of the present invention to provide a shopping cart anti-theft apparatus which is easy and economical to manufacture and install on existing shopping carts, and which will not interfere with the normal use and function of such carts.

The anti-theft apparatus according to the present invention is designed to be mounted on a swivel caster assembly which allows a wheel of the shopping cart to swivel so that the cart can be turned. The apparatus comprises a locking assembly and an actuating assembly for actuating the locking assembly when the cart passes over a magnetic barrier around the perimeter of a store parking lot.

The locking assembly is designed so that when it is actuated, the swivel caster assembly is locked against and prevents movement of the wheel into a central position which would allow straight line travel of the cart, forcing the cart, therefore, to only travel in a circular path if pushed. The actuating assembly includes a magnetic barrier to urge the locking assembly into a locking position.

The locking assembly may include a ratchet-type locking device such that, when the assembly is activated, the cart can only be pushed in circles of decreasing diameter. Alternatively, the locking assembly may be arranged to lock the swivel caster assembly in a turn-inducing position. In one embodiment the locking assembly comprises a lock ring for association with one race of the swivel caster assembly, and a locking pin for association with the other race. The actuating assembly operates to urge the pin and lock ring into locking engagement. The lock ring may have a series of ratchet teeth arranged such that when the pin is urged into locking engagement with the teeth, the cart can only be turned in circles of decreasing diameter. Alternatively, the lock ring may have a series of locking recesses in which the pin can engage to lock the swivel caster assembly in a turninducing position. In either case, once the locking assembly is actuated, the cart can only travel in a circular path when pushed.

Preferably, the actuating assembly further includes a tilt sensor device which causes the locking assembly to be actuated if the cart is tilted upwards onto its rear wheels. Thus the locking assembly is actuated even if the user tilts the cart in an attempt to avoid actuation by the magnetic barrier.

The tilt sensor device preferably comprises a tilt chamber oriented so as to be tilted in response to tilt of the cart, a tilt-lock member of a material susceptible to a magnetic field slidable in the chamber between a passive position and an advanced position in response to tilt of the chamber, and a tilt-lock magnet operatively associated with the locking assembly. The advanced position of the tilt-lock member is in the magnetic field of the tilt-lock magnet, such that when the tilt-lock magnet is magnetically attracted to the tilt-lock member it moves to an operative position in which it biasses the locking assembly towards its locking position.

The passive position of the tilt-lock member is in the magnetic field of the thrust magnet in its operative position, such that when the thrust magnet is actuated by passing over the magnetic barrier it will be held in its operative position by its magnetic attraction to the tilt-lock member, unless deactivated by a specially designed magnetic deactivating bar.

This arrangement is achieved, according to a preferred embodiment of the invention, by mounting the thrust magnet and tilt-lock magnet in magnet chambers which depend downwardly at opposite ends of the tilt chamber. The thrust magnet slides from an inoperative position at the lower end of its magnet chamber to an operative position at the upper end of the magnet chamber when it passes over the magnetic barrier. Thus, the lower end of the thrust magnet chamber is located in the magnetic field of the magnetic barrier when it passes over the barrier, and the magnetic barrier and thrust magnet magnetically repel each other. The upper end of the thrust magnet chamber is positioned adjacent the passive position end of the tilt chamber. The tilt-lock magnet chamber depends downwardly at the other end of the tilt chamber, and is positioned such that the tilt-lock magnet is unaffected by the magnetic barrier, but is attracted to its operative position by the movement of the tilt-lock member to its advanced position as a result of tilt of the cart.

The tilt chamber may be associated with a device for manually adjusting its degree of tilt from the horizontal in the normal cart position. Thus, the degree of tilt necessary to actuate the tilt-lock device can be adjusted, so as to allow for normal travel of the cart on an inclined surface, for example.

Preferably, the tilt chamber is a cylindrical chamber, and is filled with a damping fluid to restrict movement of the tilt-lock member as a result of vibrations. The chamber may be of stepped diameter, the diameter being less at the advanced position end of the chamber to further restrict movement of the tilt-lock member towards that end as a result of vibrations.

The actuating assembly is preferably mounted in a tamper resistant housing to resist outside interference with its operation. Thus, if either the thrust magnet or tilt-lock magnet is actuated to urge the locking assembly into a locking position, they will remain in their operative positions unless released by someone, for example, a store employee, passing the specially-designed magnetic deactivating bar across the side of the housing. Thus, the wheel will remain locked against swivelling and the cart can only be pushed in a circle until the actuating assembly is released by a store employee.

Preferably, a latching or locking mechanism is associated with the thrust magnet for automatically locking it in its operative position when activated. This prevents release of the thrust magnet by jamming or shaking of the apparatus. The latching mechanism preferably comprises a latch member having a portion of magnetically susceptible material adapted to be magnetically attracted to the thrust magnet in its operative position so as to move into a latching position in which it holds the thrust magnet in place.

The mechanism is preferably arranged to be automatically released by the same deactivating bar which releases the thrust magnet. This can be achieved, for example, by pivotally linking the latch member to a rotatable cam member. The cam has a portion of magnetically susceptible material adapted to be rotated in one direction by movement of the latch member into its operative position, and in the opposite direction by movement of the magnetic deactivating bar to release the thrust magnet. The motion in the opposite direction acts through the pivotal linkage to retract the latch member.

Each magnet is preferably associated with an actuating member which acts on a locking member of the locking assembly. The actuating members are magnetically attracted to the respective magnets such that they move in response to movement of the magnets to their operative positions. Movement of either one of the actuating members acts to bias the locking member towards its locking position.

Since movement of the actuating members in this arrangement is achieved by the magnetic force and no positive pushing force is applied, the actuating members can be relatively lightweight without being subject to deformation from repeated actuations. Preferably, the actuating members comprise L-shaped, relatively thin rods, each magnetically attracted at one end to the respective magnet and bearing at the other end on a pivotally mounted flipper member to which the locking member is attached.

The present invention provides a shopping cart anti-theft apparatus which is relatively easy and inexpensive to manufacture. It can be easily mounted on existing shopping carts and requires no special adaption of the wheel or wheel mountings.

It is an object of the present invention to be able to place an apparatus directly on a shopping cart which will cause the swivel wheel of the shoppng cart to lock in a cart-turning position, thereby allowing the cart to travel only in a circular path on the ground, so as to frustrate the non-permissive use or theft of the cart.

It is a further object of this invention to provide a shopping cart anti-theft apparatus which will be operatively actuated whenever the shopping cart is rolled across an actuating magnetic barrier located around the perimeter of a store parking lot.

It is another object of this invention to provide an anti-theft apparatus which will not interfere with normal use and function of the cart.

BRIEF DESCRIPTION OF THE DRAWINGS

FIG. 1 shows an end view of a typical wheel and caster assembly as mounted on a shopping cart.

FIG. 2 shows an end view of an anti-theft apparatus according to an embodiment of the invention, mounted on a wheel and caster assembly of the type shown in FIG. 1.

FIG. 3 shows an expanded side view of the apparatus in the direction 3—3 of FIG. 2, partially in section and with a side wall of the housing removed.

DETAILED DESCRIPTION OF THE DRAWINGS

Figure 4:
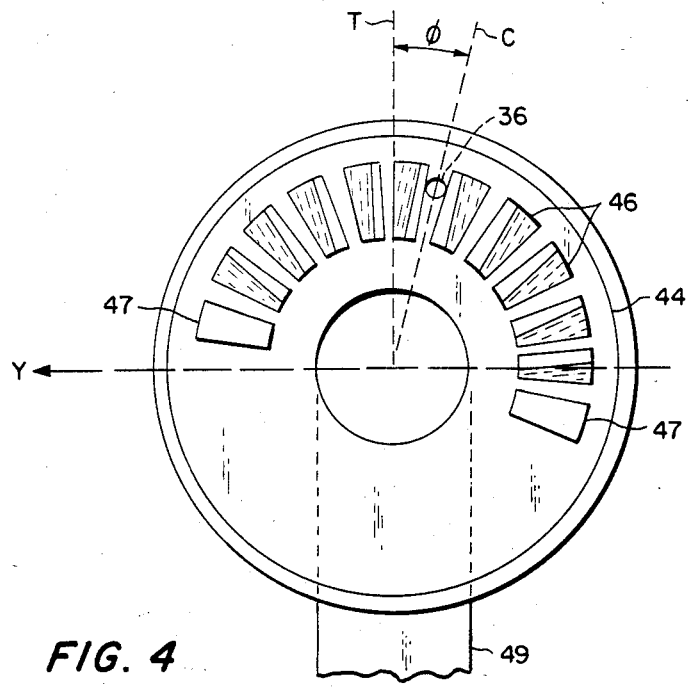
FIG. 4 is a plan view of the lower face of the upper race lock ring of FIG. 3.

FIG. 1 shows a typical wheel and caster assembly 10 mounted on the frame 12 of a typical shopping cart. An upper race 14 is mounted on a plate 16 which is attached to the frame 12. A lower race 18 is rotatably mounted on upper race 14. An inverted U-shaped caster frame member 20 is rigidly attached to the lower race 18 and a shopping cart wheel 22 is rotatably mounted in frame member 20 via axle 24. Thus, the wheel can rotate about axle 24 for forward travel of the shopping cart, and can swivel about vertical axis 26 for turning motion of the shopping cart.

FIGS. 2 and 3 show one embodiment of an anti-theft apparatus according to the present invention, suitable for mounting on one wheel and caster assembly 10 of a shopping cart of the general type shown in FIG. 1.

As shown in FIGS. 2 and 3, the anti-theft apparatus basically comprises a locking assembly 28 for preventing relative rotation between the races 14 and 18 when it is in its locking position, and an actuating assembly 30 for urging the locking assembly into its locking position.

The locking assembly 28 comprises an upper race lock ring 32 mounted over upper race 14, a lower race lock ring 34 mounted over lower race 18, and a locking pin 36 (see FIG. 3) extending through a bore 38 in lower race lock ring 34. In its locking position, pin 36 will engage in one of series of slots or recesses 40 provided in the lower face of upper race lock ring 32, as described in more detail below. The locking pin 36 is shown in a retracted position in FIG. 3.

The slots or recesses 40 are radially spaced around substantially half of the diameter of the upper race lock ring 32, and may comprise ratchet teeth 46 with locking grooves 47 at each end, as shown in FIG. 4, or may alternatively comprise a series of grooves.

As best seen in FIG. 4, the upper race lock ring 32 has a central opening 42 for positioning over upper race 14. It has a downwardly depending rim 44 around its lower face for locating the lower race lock ring 34 (as shown in FIG. 3) and to prevent disabling of the locking pin 36 by the insertion of a thin object such as a business card between the lock rings. A washer (not shown) may be positioned between the lock rings to maintain their alignment.

Figure 5:
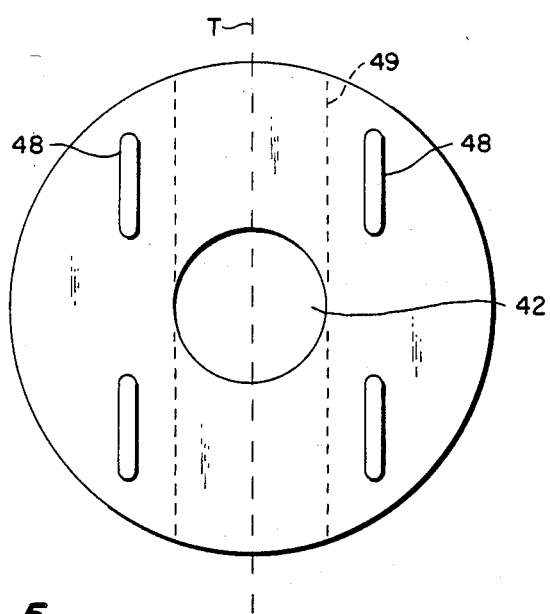
FIG. 5 is a plan view of the upper face of the upper race lock ring of FIG. 4.

FIG. 5 shows the upper face of the upper race lock ring 32. Raised abutments 48 on the ring are provided to form a channel for locating the ring relative to a shopping cart frame member 49 (shown in dotted lines in FIGS. 4 and 5) so as to prevent rotation of the ring. Thus the lock ring 32 does not have to be rigidly attached to the cart frame 12. An indent channel may be provided instead of raised abutments for locating the frame member 49. The positioning of the abutments is dependent on the type of cart on which the apparatus is to be mounted, and the lock ring 32 can therefore be designed to be easily located on various types of shopping cart frames.

The lower face of the lock ring 32 is shown in FIG. 4. The series of ratchet teeth 46 is positioned off-center with respect to a mounting line T determining the orientation at which the ring 32 will be mounted on the shopping cart. The arrow Y shows the direction for travel of the cart in a straight line.

The ratchet teeth 46 are inclined in opposite directions about a center line C which is arranged to lie directly above the locking pin 36, when the lock rings 32 and 34 are in position for travel in straight line direction. This position of the pin 36 is indicated in dotted outline in FIG. 4. When the actuating assembly is operated, the pin 36 will be urged upwards. Any attempt to turn the cart will result in rotation of the lock ring 34, and thus the pin 36, relative to the lock ring 32. The pin 36 will then move upwards into the overlying recess formed by the ratchet teeth, and the ratchet locking engagement is then such that the cart can only be turned in circles of decreasing diameter until the pin 36 engages in one or other of the locking grooves 47.

In a preferred embodiment of the invention, the center line C of the ratchet teeth is at an angle of about 15 to the central mounting line T defined between mounting abutments 48. This positioning will be determined by the position of the pin 36 and bore 38 relative to the lock ring 32 when the apparatus is mounted on a shopping cart, so that the pin 36 and bore 38 lie directly beneath the center line C when in the position for straight line movement of the cart.

In the embodiment shown, the teeth 46 and grooves 47 extend approximately 200 degrees around the lock ring, to ensure that locking engagement will result even when a sharp turn is attempted.

As mentioned above, a series of locking grooves similar to end locking grooves 47 may be provided instead of ratchet teeth 46. In this case, on operation of the actuating assembly the pin will engage in an overlaying groove to prevent relative rotation between the lock rings and thus hold the cart to turn in a fixed circle.

The actuating assembly 30 is shown in FIG. 3 and is mounted in a main housing 50 which depends downwardly from lower race lock ring 34 alongside of wheel 22, as shown in FIG. 2. The lower race lock ring 34 and main housing 50 are preferably molded in one piece from plastics material for ease of manufacture. A vibration damping device, such as a rubber pad, may be mounted between the housing 50 and the caster frame member 20 if desired, to reduce the effects of vibration.

FIG. 3 shows a side wall of the main housing 50 removed so that the actuating assembly 30, shown in section, is visible. The actuating assembly 30 includes a thrust magnet 54 vertically slidable in a first magnet chamber 56 of a magnet housing 58, and a tilt-lock magnet 60 vertically slidable in a second magnet chamber 62 of the magnet housing 58. A flipper member 64 is pivotally mounted at one end 66 on the upper face of magnet housing 58 and is connected at its other end 68 to the lower end of locking pin 36 which extends downwardly out of bore 38 into the main housing 50.

A thrust actuating member comprising a first L-shaped lift rod 70 of a material susceptible to a magnetic field engages the lower face of thrust magnet 54 and extends out of the first magnet chamber 56 via a vertical slot 72. Lift rod 70 then extends upwards to engage flipper member 64 at an intermediate point in its length. Similarly, a tilt actuating member comprising a second L-shaped lift rod 74 extends from the lower face of tilt-lock magnet 60, out of second chamber 62 via a vertical slot 76 and upwards to engage the flipper member 64 at an adjacent point.

Magnet housing 58 further includes a substantially horizontal tilt chamber 78 of stepped diameter in which a tilt-lock ball 80 of magnetically susceptible material, suitably steel, is slidably located. Chamber 78 preferably contains a damping fluid 81, such as an oil, to prevent undesired motion of tilt-lock ball 80 as a result of vibration. The reduction in diameter provides further hydraulic resistance to movement of the ball 80.

Although magnet housing 58 is shown in FIG. 3 with the tilt chamber 78 substantially horizontal, the magnet housing is preferably mounted via pins 82 on a rotatable disc 83 in the side wall of main housing 50 which faces wheel 22, to allow the tilt of chamber 78 relative to the horizontal to be adjusted. Preferably, the disc allows the chamber to be tipped adjustably downwards from approximately 8 degrees to approximately 24 degrees from the horizontal to make the device either more or less sensitive to tipping of the shopping cart, as described in more detail below.

The anti-theft apparatus of this invention is designed to be used in conjunction with a raised magnetic barrier 84 which extends around the perimeter of a store parking lot, for example, or another area within which carts are to be confined. The barrier 84 is of metal and has a magnetic strip or strips 86 located in its upper face. The upper face of the strip or each strip 86 is of the same polarity as the lower end of thrust magnet 54. For proper operation, the vertical spacing between the lower end of thrust magnet 54 and the upper face of strip 86 should be no more than 1⅜".

In operation, when a shopping cart incorporating the anti-theft apparatus described above is rolled over barrier 84, the magnetic field strengths are such that thrust magnet 54 is repelled from magnetic strip 86 and rises to the top of its chamber 56. First lift rod 70 is magnetically attracted to the thrust magnet 54 and so will also rise along slot 72, lifting flipper member 64 and urging locking pin 36 towards a locking position. Thus, as soon as the person attempting to remove the shopping cart from the designated area tries to turn the cart, the locking pin 36 will become aligned with one of the recesses 40 and will be urged upwards by the magnetic force into the aligned recess. The ratchet locking action then allows the cart only to be turned in one direction in circles of decreasing diameter, until the pin 36 engages in one of the locking grooves, effectively locking race 14 relative to race 18. Attempts to push the cart in a straight line will thus result in a circular motion.

The specific recess 40 in which the locking pin 36 is located will depend on the direction in which the cart is turned and the speed with which it was turned. The recess 40 may comprise ratchet teeth as shown in FIG. 4, or may comprise radially spaced grooves. If the recesses are radially spaced grooves, race 14 is locked relative to race 18 as soon as pin 36 is engaged in one of the grooves. Since the recesses are arranged to extend about 90 degrees to 100 degrees in each direction about their center line C, (see FIG. 4), even very sharp turns will result in locking of the swivel caster races.

When thrust magnet 54 is in its raised position it will remain in this position even when it moves away from barrier 84, due to its magnetic attraction to tilt-lock ball 80 and also due to the fact that the upper ends of magnet 54 and 60 are arranged to be of opposite polarity. Thus, the locking pin 36 will remain locked in an aligned recess unless a specially designed magnetic release bar is passed across the side of housing 50 in the vicinity of tilt chamber 78. The passing face of the bar is of the same polarity as the upper end of the thrust magnet 54, and deactivates the device by repelling thrust magnet 54 back to the bottom of its chamber 56. This forces lift rod 70 back to its lower position and locking pin 36 moves downward out of the aligned recess as a result of gravity.

Thus, anyone attempting to remove a cart from a shopping area or parking lot by pushing it over the barrier 84 will find the cart is effectively disabled and can only be pushed in circles. The cart can only be released for normal use by someone with the necessary magnetic release bar, such as a store employee.

In FIG. 3, the tilt-lock ball 80 is shown in its normal, passive position at one end 90 at the front of tilt chamber 78. In practice the tilt chamber will be tilted slightly towards the passive position to ensure that the ball 80 remains in the passive position, regardless of normal vibrations during use of the cart, and also to allow carts to be pushed on inclined surfaces within the shopping center area. The stepped chamber 78 and damping fluid in the chamber also act to normally hold the tilt-lock ball in its passive position.

A person may attempt to avoid locking of the cart wheels by tilting the front of the cart upward and onto its rear wheels as it passes over the magnetic barrier 84. In this event, thrust magnet 54 is not actuated since it is not close enough to the magnetic strip 86. However, when the cart is tilted upwards, the front end of tilt chamber 78 will also tilt upwards until a point is reached at which the tilt-lock ball 80 moves under the action of gravity from one end 90 to the other end 92 at the rear of tilt chamber 78. The amount by which the cart can be tilted before this happens is dependent on the initial forward tilt of chamber 78, which can be set as desired by adjustment of rotatable disc 83. The disc preferably allows for a forward tilt bias of up to 24 degrees, the maximum being used, for example, in areas where carts must be wheeled up slopes in the shopping or parking areas. A smaller angle will make the device more sensitive to tilt.

When the tilt-lock ball 80 reaches an advanced position at the rear end 92 of tilt chamber 78, it moves into the magnetic field of tilt-lock magnet 60, which moves upward as a result of its magnetic attraction to ball 80.

The second lift rod 74 also moves upwards as a result of its attraction to magnet 60, urging the flipper member 64 and locking pin 36 again towards the locking position. Thus, when the cart is again placed on the ground and the person pushing it attempts to make a turn, the pin 36 will become aligned with one of the recesses 40 and be urged into locking engagement with the aligned recess. The cart will therefore be locked into a turning position and will turn in circles if pushed. It will remain in this position until deactivated by someone such as a store employee passing the appropriate magnetic bar across the housing in the vicinity of the tilt chamber 78 to move the tilt-lock ball 80 back to its passive position and release the tilt-lock magnet 60.

Since the lift rods 70 and 74 are moved upwards by magnetic attraction, no positive pushing force is applied to them and they are therefore not subject to distortions as a result of such forces, which may otherwise result in malfunction of the apparatus.

In a preferred embodiment of the invention, the thrust and tilt-lock magnets 54 and 60 each comprise a set of magnetic wafers. The thrust magnet 54 comprises six (6) wafers of dimensions approximately 12.5 millimeters diameter and 5 millimeters in thickness. The tiltlock magnet 60 comprises four (4) wafers of the same dimensions. Magnets suitable for the apparatus are designated as FB₃BD12.5×5 by TDK Corporation. The barrier magnet strip 86 is a rectangular class 5 magnet designated FB₄CW47.63×22.23×9.84 by TDK Corporation. The thrust magnet is positioned to be in the magnetic field of the barrier when it passes over it. This is achieved when the spacing between the lower end of the barrier strip 86 is less than 1⅞". Clearly these dimensions must be adjusted if different strength magnets are used.

Figure 6:
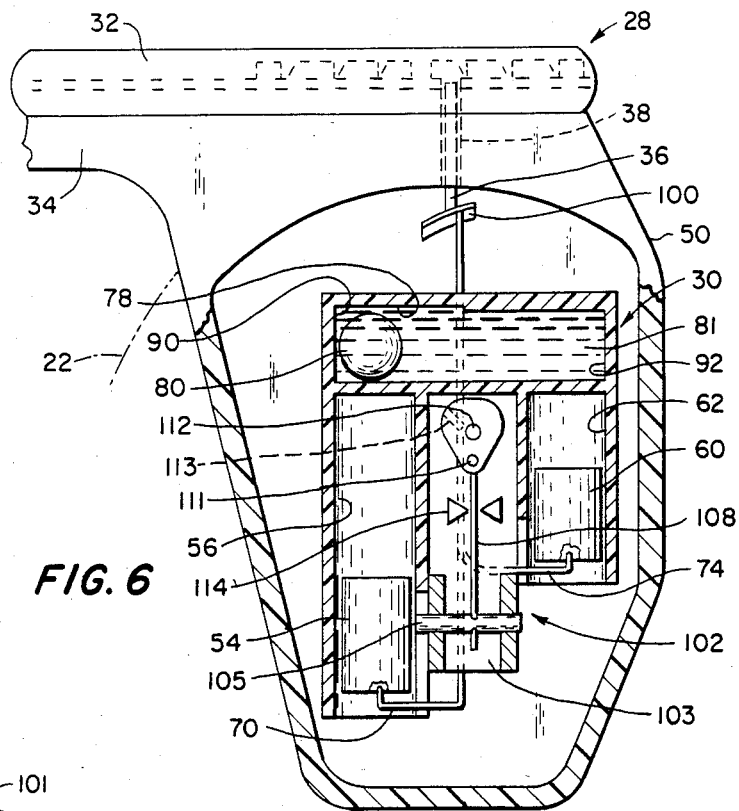
FIG. 6 is a view similar to FIG. 3 showing a modified embodiment of the anti-theft apparatus of the invention, in which an anti-jarring locking mechanism is included.

FIG. 6 shows a modified embodiment of the antitheft apparatus according to the present invention. The construction and operation of the apparatus shown in FIG. 6 is the same as that of the apparatus of FIG. 3, except as described below, and like reference numerals have been used where appropriate.

In the apparatus shown in FIG. 6, flipper member 64 has been removed and the lift rods 70 and 74 act directly on an elongate, curved head portion 100 of the locking pin 36. The head portion extends over a distance sufficient to cover the maximum degree of tilt of the tilt chamber 78, so that the lift rods will still engage the head portion 100 when the cart is tilted upwards as described above. In a preferred embodiment the curved portion encloses an angle of 24 degrees, which is the maximum degree of tilt for which the rotatable disc 83 (not visible in FIG. 6) can be set.

Figure 8:
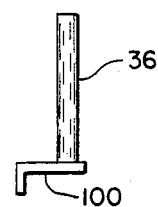
FIG. 8 is a front end view of the locking pin of the FIG. 6 embodiment.

As best seen in FIG. 8, the head portion 100 is of L-shaped cross-section. This helps in locating the lift rods 70 and 74 against the head portion 100.

Figure 7:
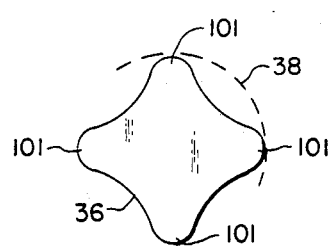
FIG. 7 is a cross-section on an enlarged scale through a suitable locking pin for use in the embodiments of FIG. 3 or FIG. 6.

The shaft of locking pin 36 in the FIG. 3 or FIG. 6 embodiment may be of circular cross-section, or may alternatively be of the lobed cross-section shown in FIG. 7. This helps to reduce friction between the pin 36 and the walls of the bore 38, since the pin 36 only engages the bore 38 at four points 101 defined by the lobes. This shape allows the pin to slide more easily and results in a smoother locking and releasing motions.

Figure 9:
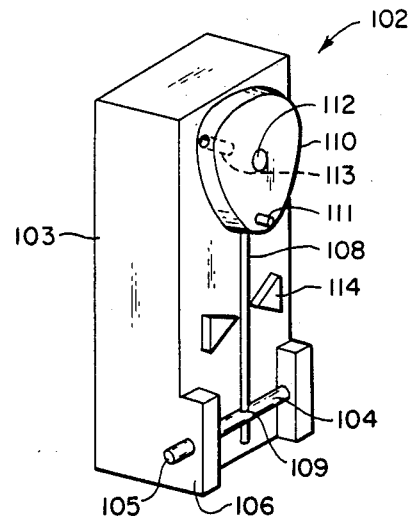
FIG. 9 is a perspective view of the anti-jarring locking mechanism of FIG. 6.

The operation of the locking assembly 28 and actuating assembly 30 in the FIG. 6 embodiment is the same as described in connection with the FIG. 3 embodiment. However, in FIG. 6 an anti-jarring locking mechanism 102, shown in more detail in FIG. 9, has been incorporated to latch the thrust magnet 54 in its operative position. The mechanism 102 was added because it was found that in some cases jarring or shaking of the apparatus after barrier 84 had been crossed was sufficient to release the magnet 54 so that it slid back down its magnet chamber 56, thus releasing the locking pin 36 and allowing the shopping cart to be used normally.

The anti-jarring locking or latching mechanism 102 is mounted on a carriage 103 between magnet chambers 56 and 62 in front of the lift rods 70 and 74. The mechanism includes a latch member 104 slidable via a second vertical slot into magnet chamber 62. The vertical slot 105 is spaced in front of vertical slot 72 through which the lift rod 70 extends. The latch member 104 comprises a rod of non-magnetic material such as aluminum with an end portion 105 of magnetically susceptible material such as steel extending into the magnet chamber 62. The member 104 may, for example, comprise an aluminum tube with a piece of steel inserted in end portion 106.

The latch member 104 is slidably guided in bores extending through opposed flanges 106 on the carriage 103. A vertically extending L-shaped link rod 108 extends through a transverse bore 109 in the member 104 at one end and projects outwardly through a bore in a tearshaped cam member 110 at its other end 111. Rod 108 is of a non-magnetic material such as brass. Cam member 110 is rotatably mounted on the carriage 103 via pin 112. Cam member 110 is of non-magnetic material such as plastic and has a radial bore 113 containing magnetically susceptible material, such as a steel rod or wire. Wedges 114 located on either side of L-shaped rod 108 at an intermediate point in its length act as pivots when the mechanism is actuated.

In the operative position shown in FIG. 6 the latch member 104 rests against the side of magnet 54. When the shopping cart wheel 22 passes over the magnetic barrier 84, as described in connectiion with FIG. 4, thrust magnet slides upwardly in chamber 56 and thus lift rod 70 urges the locking pin 36 towards its locking position. The latch member 104 moves upwardly into the chamber 56 beneath the thrust magnet 54 as soon as it is free to do so, because of the attraction of end portion 105 to the magnet 54, thus preventing the magnet 54 from falling back down into its inoperative position as a result of jarring or shaking.

As the latch member moves inwardly, the link rod 108 pivots about wedges 114 and rotates cam member 110 in a counter-clockwise direction. The steel rod or wire in bore 113 will be positioned substantially horizontally when the latch member 104 is in its operative position.

When the magnetic release bar is passed across the side of the housing 50 by an operator to deactivate the device, the magnetic rod or wire in bore 113 will be attracted to the release bar and will rotate the cam member back to the inoperative position shown. Thus the rod 108 pivots around wedges 114 to pull the latch member 104 back out of the magnet chamber 56. This allows the thrust magnet 54 to fall back to the bottom of chamber 56 as the magnetic release bar frees the thrust magnet 54.

The angle of the bore 113 in which magnetic material is located is fairly critical. It should be such that when the mechanism is in its operative position, the bore 113 is substantially horizontal. In a preferred embodiment this angle is 60 degrees from the horizontal plane.

The incorporation of the magnetically actuated anti-jar locking mechanism into the anti-theft apparatus therefore provides even better security, since the thrust magnet is latched in its operative position automatically by the mechanism, and cannot be released by jarring or shaking the apparatus. The mechanism is designed to be deactivated automatically by the same magnetic release bar which is used to release the thrust magnet 54.

The present anti-theft apparatus can be easily mounted on existing shopping carts without any special adjustment to the cart being necessary. The upper race lock ring is designed to be freely mounted over an upper race of a swivel caster and to engage a surface of the cart frame so that it cannot rotate, and the lower race lock ring and housing are arranged to be mounted over a lower race of the swivel caster.

The anti-theft apparatus described effectively prevents people from removing shopping carts from parking lots unless they physically carry them away. If they try to push a cart out of the parking area the locking assembly will be actuated and the cart will rotate in a circle when they attempt to make a turn. This clearly provides an effective deterrent to the unauthorized removal of shopping carts, particularly in cases where people want to use the carts to transport shopping to their homes, which is the major cause of shopping cart theft.

The design of the apparatus prevents easy manual tampering with the locking assembly, since all moving elements are within the housings and lock rings. The apparatus is relatively inexpensive and easy to manufacture and install, and will not interfere with normal use of a shopping cart.

It will be clear that modifications can be made to the disclosed embodiment without departing from the scope of the invention. The invention is therefore not limited to the disclosed embodiment but is defined by the appended claims.

What is claimed is:

1. Anti-theft apparatus for use on a cart, said cart having swivel casters associated with its wheels to allow for turning movement of the cart, said anti-theft apparatus comprising:

locking means for association with one of said swivel casters, said locking means including a locking member movable between a release position and a locking position in which it locks said swivel caster against movement into a position which allows said cart to travel in a straight line, whereby the cart can only travel in a circular path; and actuating means associated with said locking member, said actuating means including magnetic means adapted to be actuated when the wheel associated with said swivel caster passes over a magnetic barrier means to urge said locking member into said locking position.

2. The apparatus of claim 1, wherein said magnetic means comprises a thrust magnet movable in response to the magnetic field of said magnetic barrier means between an inoperative position and an operative position in which said locking member is biassed towards said locking position; and retaining means are provided for retaining said thrust magnet in said operative position.

3. The apparatus of claim 2, wherein said retaining means includes a magnetically operated latch mechanism adapted to latch said thrust magnet in said operative position.

4. The apparatus of claim 2, wherein said actuating means and said locking member are enclosed in a tamper-resistant housing.

5. The apparatus of claim 2, including a thrust actuating member magnetically attracted to said thrust magnet and operatively associated with said locking member, such that movement of said thrust magnet to said operative position causes movement of said thrust actuating member as a result of said magnetic attraction to a position in which it biasses said locking member towards said locking position.

6. The apparatus of claim 2, wherein said actuating means further includes tilt-sensing means for actuating said locking member in response to tilt of said cart on its rear wheels.

7. The apparatus of claim 5, wherein said tilt sensing means comprises a tilt chamber oriented in the direction of travel of said cart such that tilt of said cart causes tilt of said chamber, a tilt-lock member of a material susceptible to a magnetic field slidable in said chamber between a passive position at one end of said chamber and an advanced position at the other end of said chamber in response to tilt of said chamber, and a tilt-lock magnet operatively associated with said locking member, said advanced position of said tilt-lock member being in the magnetic field of said tilt-lock magnet and said tilt-lock magnet being adapted to move in response to its attraction to said tilt-lock member in said advanced position between an inoperative position and an operative position in which it biasses said locking member towards said locking position.

8. The apparatus of claim 7, wherein the normal orientation of said tilt chamber with respect to the horizontal direction is manually adjustable such that the degree of tilt of said cart necessary to actuate said tilt sensing means can be pre-set.

9. The apparatus of claim 7, wherein said tilt sensing means further includes a tilt actuating member magnetically attracted to said tilt-lock magnet and operatively associated with said locking member, such that movement of said tilt-lock magnet to said operative position causes movement of said tilt actuating member in response to its magnetic attraction to said tilt-lock magnet to a position in which it biasses said locking member towards said locking position.

10. The apparatus of claim 7, wherein said tilt chamber comprises a cylindrical chamber filled with a damping fluid to restrict movement of said tilt-lock member as a result of vibration.

11. The apparatus of claim 10, wherein said chamber is of stepped diameter, the diameter being smaller at the advanced position end so as to further resist movement of said tilt-lock member towards its advanced position as a result of vibration.

12. The apparatus of claim 10, wherein said tilt-lock member is a steel ball.

13. The apparatus of claim 7, wherein said thrust magnet is positioned in its operative position so as to be magnetically attracted to said tilt-lock member in its passive position.

14. The apparatus of claim 13, wherein two magnet chambers depend downwardly at opposite ends of said tilt chamber, said thrust magnet being slidable in a first one of said magnet chambers adjacent the passive end of said tilt chamber between its inoperative position at the lower end of said first magnet chamber and its operative position at the upper end of said first magnet chamber; and said tilt-lock magnet being slidable in the second one of said magnet chambers adjacent the advanced end of said tilt chamber between its inoperative position at the lower end of said second magnet chamber and its operative position at the upper end of said second magnet chamber.

15. The apparatus of claim 14, including a thrust actuating member magnetically attracted to said thrust magnet such that it moves with said thrust magnet, and a tilt actuating member magnetically attracted to said tilt-lock magnet such that it moves in response to movement of said tilt-lock magnet, said actuating members being operatively associated with said locking member.

16. The apparatus of claim 15, wherein a pivotally mounted flipper member is freely connected at one end to said locking member, and said actuating members bear on said flipper member at an intermediate point such that operative movement of either magnet causes movement of its associated actuating member to bias said locking member towards its locking position.

17. The apparatus of claim 15, wherein said locking member comprises a pin having an elongate, transverse head portion at one end against which said actuating members bear to urge said pin towards said locking position on actuation of either magnet.

18. The apparatus of claim 17, wherein the orientation of said tilt chamber to the horizontal is manually adjustable and said head portion is curved and encloses an angle equal to the maximum angle of adjustment of said tilt chamber.

19. The apparatus of claim 2, wherein said locking means is adapted to be associated with a swivel caster comprising an upper race attached to the frame of a cart and a lower race rotatable with respect to the upper race and attached to a wheel of the cart; and said locking means comprises an upper-race lock ring adapted for mounting over the upper race of said swivel caster and a lower race lock ring adapted for mounting over said lower race of said swivel caster, said locking member being adapted to maintain said lock rings in a turn-inducing position in its locking position.

20. The apparatus of claim 19, wherein said upper race lock ring has a plurality of recesses in its lower face, said lower race lock ring has a bore positioned so that it can be aligned with any one of said recesses by relative rotation of said lock rings, and said locking member comprises a pin extending through said bore, said pin being arranged to move in response to said actuating means to a position in which it engages in an aligned one of said recesses to maintain said lock rings in a turn-inducing position.

21. The apparatus of claim 20, wherein said recesses are defined by a plurality of ratchet teeth extending around substantially half of the diameter of said lock ring, said ratchet teeth changing direction at a position located above said bore when said lock rings are in position for straight line travel, said pin moving into locking engagement with said ratchet teeth in response to said actuating means, said ratchet locking engagement being such that said cart can only be turned in circles of everdecreasing radius when said pin is in locking engagement with said teeth.

22. The apparatus of claim 20, wherein said pin is of multi-lobed cross-section and is adapted to engage the wall of said bore at a plurality of spaced points at the outer extremities of said lobes.

23. Anti-theft apparatus as claimed in claim 1,
wherein said magnetic means comprises a thrust magnet movable in response to the magnetic field of said magnetic barrier means between an inoperative position and an operative position in which said locking member is biased towards said locking position; and including retaining means for retaining said thrust magnet in said operative position until positively released by external release means, said retaining means comprising an antijarring locking mechanism including a latch member, said latch member being magnetically attracted to said thrust magnet in said operative position, said magnetic attraction acting to urge said latch member from its inoperative position into a latching position in which it holds said thrust magnet in its operative position.

24. The apparatus of claim 23, wherein said actuating means further includes tilt-sensing means for actuating said locking member in response to tilt of said cart on its rear wheels, said tilt sensing means comprising:

a tilt chamber oriented in the direction of travel of said cart such that tilt of said cart causes tilt of said chamber;

a tilt-lock member of a material susceptible to a magnetic field slidable in said chamber between a passive position at one end of said chamber and an advanced position at the other end of said chamber in response to tilt of said chamber; and a tilt-lock magnet operatively associated with said locking member, said advanced position of said tilt-lock member being in the magnetic field of said tilt-lock magnet and said tilt-lock magnet being adapted to move in response to its attraction to said tilt-lock member in said advanced position between an inoperative position and an operative position in which it biasses said locking member towards said locking position;

said tilt chamber having two magnet chambers depending downwardly from opposite ends of said tilt chamber, said thrust magnet being slidable in a first one of said magnet chambers adjacent the passive end of said tilt chamber between its inoperative position at the lower end of said first magnet chamber and its operative position at the upper end of said first magnet chamber;

said tilt-lock magnet being slidable in the second one of said magnet chambers adjacent the advanced end of said tilt chamber between its inoperative position at the lower end of said second magnet chamber and its operative position at the upper end of said second magnet chamber, said locking mechanism being mounted adjacent said first magnet chamber, said first magnet chamber having a vertical slot through which said latch member projects into said magnet chamber, said latch member having a portion of magnetically susceptible material at its end projecting into said chamber and being slidably mounted so as to be moveable horizontally between its inoperative position and its latching position in which it projects into said chamber to latch said thrust magnet in its operative position.

25. The apparatus of claim 24, wherein said locking mechanism incorporates means for automatically retracting said latch member on operation of external magnetic release means to deactivate said apparatus, said retracting means comprising a rotatable cam member, means pivotally linking said cam member to said latch member, said cam member being of non-magnetic material and having a portion of magnetically susceptible material, said magnetic portion being positioned on said cam member so as to be rotated in one direction by movement of said latch member into said latching position and rotated in the opposite direction by operation of said external release means, said opposite direction of rotation acting via said linking means to retract said latch member into its inoperative position so as to allow release of said thrust magnet.

* * * * *